US008538653B2

(12) United States Patent
Miyajima et al.

(10) Patent No.: US 8,538,653 B2
(45) Date of Patent: Sep. 17, 2013

(54) BRAKE CONTROL APPARATUS

(75) Inventors: Ayumu Miyajima, Hitachinaka (JP); Masatsugu Arai, Kasumigaura (JP); Toshiyuki Innami, Mito (JP); Kimio Nishino, Minamiarupusu (JP); Norikazu Matsuzaki, Minamiarupusu (JP); Masayuki Kikawa, Kai (JP); Makoto Yamakado, Tsuchiura (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 356 days.

(21) Appl. No.: 13/060,579

(22) PCT Filed: Oct. 9, 2009

(86) PCT No.: PCT/JP2009/067645
§ 371 (c)(1),
(2), (4) Date: May 4, 2011

(87) PCT Pub. No.: WO2010/044379
PCT Pub. Date: Apr. 22, 2010

(65) Prior Publication Data
US 2011/0202250 A1 Aug. 18, 2011

(30) Foreign Application Priority Data
Oct. 14, 2008 (JP) ................. 2008-264748

(51) Int. Cl.
*G06F 7/70* (2006.01)
(52) U.S. Cl.
USPC ....... 701/70; 303/113.2; 303/113.3; 303/140; 701/71; 701/78
(58) Field of Classification Search
USPC ............ 701/70; 303/113.2, 140, 121, 113.3, 303/155, 133, 9.63, 146, 151, 122.03, 122.1
See application file for complete search history.

(56) References Cited

U.S. PATENT DOCUMENTS 3,463,378 A * 8/1969 van Daalen ................. 229/164.2
6,863,355 B2 * 3/2005 Nishio et al. ................. 303/140
(Continued)

FOREIGN PATENT DOCUMENTS

JP 11-263211 A 9/1999
JP 2001-347936 A 12/2001
(Continued)

OTHER PUBLICATIONS

Chinese Office Action with English translation dated Nov. 23, 2012 (nine (9) pages).
(Continued)

*Primary Examiner* — Behrang Badii
(74) *Attorney, Agent, or Firm* — Crowell & Moring LLP

(57) ABSTRACT

Disclosed is a brake control apparatus which includes a brake booster for augmenting deceleration, and which addresses the problem in conventional brake control apparatuses that deceleration and pedal reaction force depend on driver brake pedal input, and thus the pedal response and the ride comfort from the feeling of deceleration are affected by the manner in which the brake pedal is actuated by the driver. The brake control apparatus comprises a pedal reaction force generation unit for generating a pedal reaction force on the brake pedal, and a brake control unit for controlling the brake force in such a way as to suppress driver brake input fluctuations, wherein the pedal reaction force generation unit suppresses pedal reaction force fluctuations in accordance with specific deceleration and pedal reaction force characteristics. The brake control apparatus further comprises a calculation unit for calculating a target deceleration on the basis of lateral jerk information in the left-to-right direction of the vehicle, wherein the brake control unit suppresses the brake force in such a way that the target deceleration is produced and, when the amount by which the brake pedal is depressed reaches a specific amount in respect of the target deceleration, the pedal reaction force generated by the pedal reaction force generation unit may be increased.

8 Claims, 7 Drawing Sheets

(56) References Cited

U.S. PATENT DOCUMENTS

| | | | |
|---|---|---|---|
| 8,246,122 B2* | 8/2012 | Yamamoto | 303/122.03 |
| 2002/0010535 A1* | 1/2002 | Nishio | 701/70 |
| 2003/0117013 A1* | 6/2003 | Nishio et al. | 303/113.2 |
| 2003/0201669 A1 | 10/2003 | Yokoyama et al. | |
| 2006/0163941 A1 | 7/2006 | Von Hayn et al. | |
| 2007/0273204 A1* | 11/2007 | Kodama et al. | 303/146 |
| 2008/0210499 A1 | 9/2008 | Isono et al. | |
| 2012/0038209 A1* | 2/2012 | Yamamoto | 303/9.63 |

FOREIGN PATENT DOCUMENTS

| | | |
|---|---|---|
| JP | 2003-293798 A | 10/2003 |
| JP | 2003-312463 A | 11/2003 |
| JP | 2005-112034 A | 4/2005 |
| JP | 2005-532220 A | 10/2005 |
| JP | 2006-281867 A | 10/2006 |
| JP | 2007-112367 A | 5/2007 |
| JP | 2007-203804 A | 8/2007 |
| WO | WO 2004/005095 A1 | 1/2004 |

OTHER PUBLICATIONS

"Understanding and Evaluation of Driver and Vehicle Dynamic Characteristics based upon Jerk Information—An Investigation of Longitudinal and Lateral Integrated Control", Makoto Yamakado, Collected Papers of Society of Automotive Engineers of Japan, vol. 39, No. 3, May 2008.

"Study on Handling Characteristics of Longitudinal Acceleration Controlled Vehicle Combined with Lateral Motion—Proposal of Acceleration (G) Vectoring Control for the Improvement of Vehicle Agility and Stability", Makoto Yamakado, Spring Academic Lecture Meeting Preliminary Reports of Society of Automotive Engineers of Japan, 36-20085351, 2008.

International Search Report dated Jan. 26, 2010 (two (2) pages).

* cited by examiner

BRAKE CONTROL APPARATUS

BACKGROUND OF THE INVENTION (1) Field of the Invention

The present invention relates to a brake control apparatus provided with an assisting apparatus assisting a stepping force of a brake pedal.

(2) Description of Related Art

At a time of decelerating a vehicle, a driver obtains a desired deceleration by stepping on a brake pedal. At this time, the driver is exposed to a pedal reaction force in correspondence to a stroke amount. In order to smoothly decelerate the vehicle, it is necessary to fine adjust the pedal reaction force and the deceleration, a vehicle ride quality caused by a deceleration feeding depends on a skill of the driver. In recent years, there attract attention a brake by wire (hereinafter, refer to as BBW) which interrupts a vibration transmission system by mechanically giving the pedal independence, thereby varying a brake force and the pedal reaction force (refer to patent document 1).

PRIOR ART DOCUMENT

Patent Document

Patent Document 1: JP-A-2005-112034

BRIEF SUMMARY OF THE INVENTION

Problem to be Solved by the Invention

In accordance with the patent document 1, a spring reaction force of a stroke simulator can be varied, however, since the structure is made such that the deceleration and the pedal reaction force still depend on a pedal input of the driver, there is a problem that a ride quality of a vehicle and a pedal feeling which are caused by a deceleration feeling are affected by an operation of the driver. In the case that a brake operation and a steering operation are simultaneously carried out, particularly such as a curve deceleration, a control object is increased, and there is such a problem that a burden of the driver is enlarged. In other words, in the BBW, a pedal reaction force creating mechanism transmitting a brake state to the driver is not considered.

Accordingly, an object of the present invention is to provide a brake control apparatus which creates a brake force well keeping a deceleration feeling and controls a pedal reaction force so as to improve a pedal feeling.

Means for Solving the Problem

In order to achieve the object mentioned above, one of desired aspects of the present invention is as follows.

A brake control apparatus provided with a brake assisting apparatus accelerating and decelerating a vehicle is provided a pedal reaction force creating portion generating a pedal reaction force in a brake pedal, and a brake control portion controlling a brake force in such a manner as to hold down a brake input fluctuation of a driver, wherein the pedal reaction force creating portion holds down a fluctuation of the pedal reaction force in correspondence to a predetermined deceleration and a pedal reaction force characteristic.

Effect of the Invention

In accordance with the present invention, it is possible to provide the brake control apparatus which creates the brake force well keeping the deceleration feeling, and controls the pedal reaction force so as to improve the pedal feeling.

Other objects, features and advantages of the invention will become apparent from the following description of the embodiments of the invention taken in conjunction with the accompanying drawings.

DETAILED DESCRIPTION OF THE INVENTION

A description will be given below of an embodiment with reference to the accompanying drawings.

Figure 1:
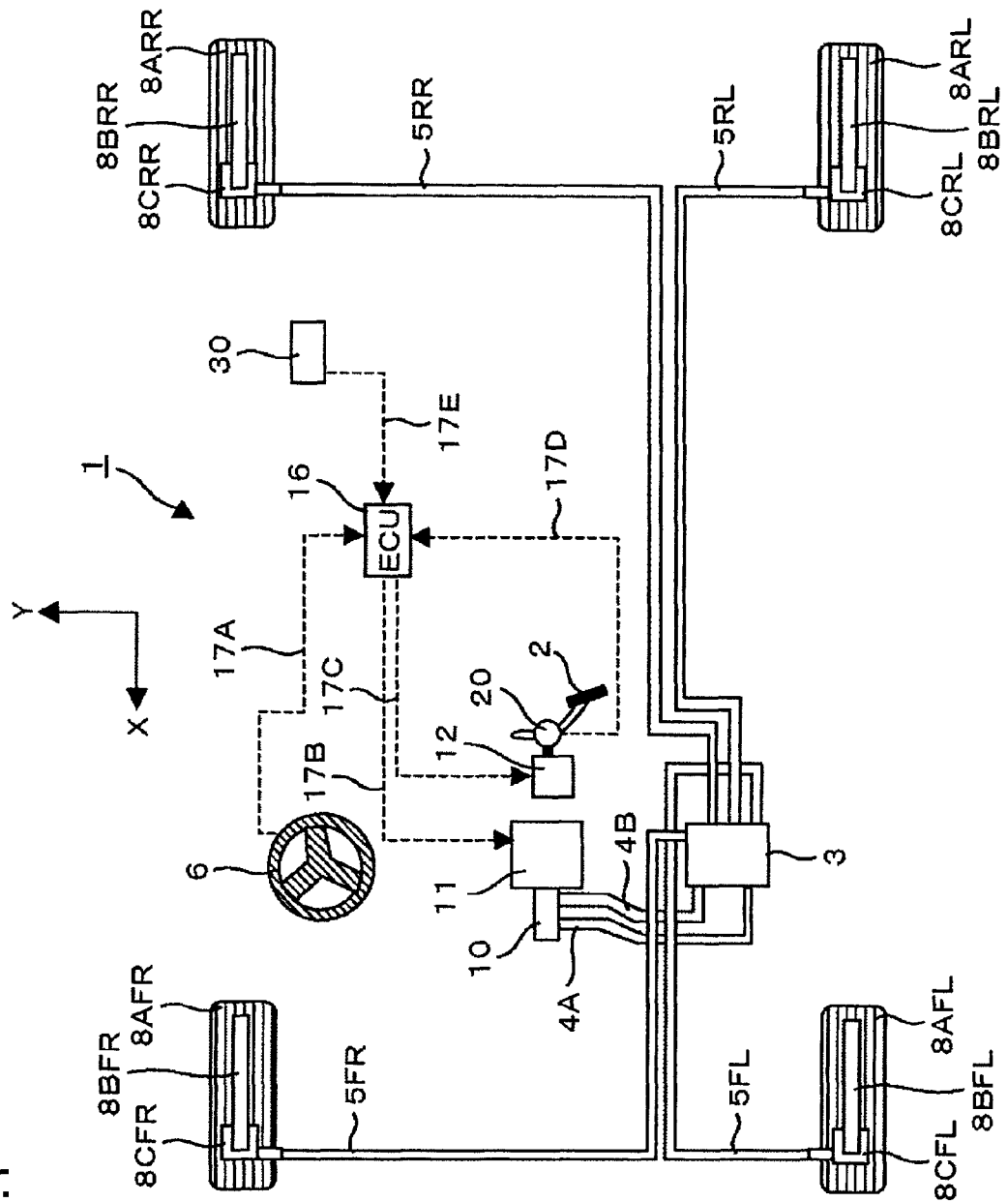
FIG. 1 is a plan view of a brake control apparatus of a brake by wire.
Figure 2:
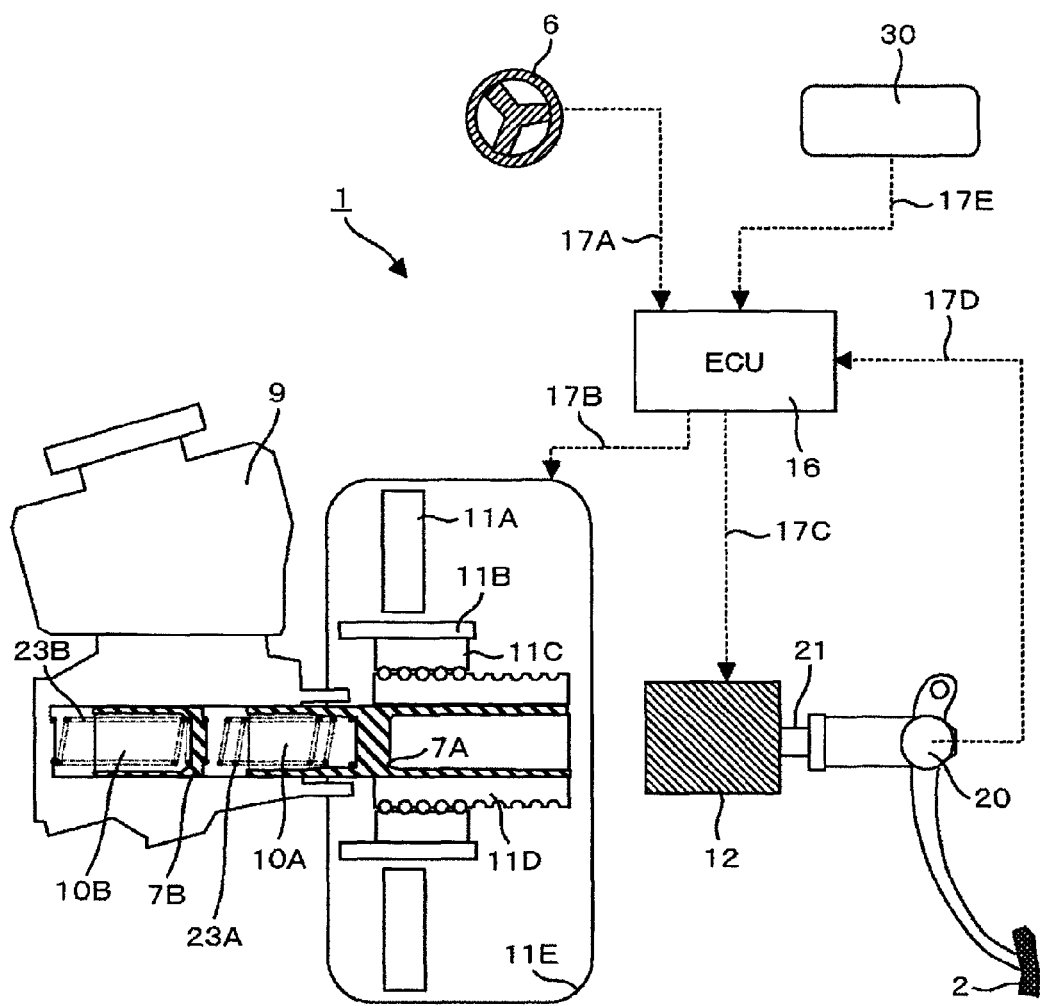
FIG. 2 is a cross sectional view of the brake control apparatus of the brake by wire.

FIG. 1 is a plan view of a brake control apparatus of a BBW, and FIG. 2 is a cross sectional view of the brake control apparatus of the BBW.

The brake control apparatus of the BBW is constructed by a motor-driven actuator 1 generating a fluid pressure for assisting a brake, a brake pedal 2, a brake pressure distributing apparatus 3, brake pipings 4 and 5, a piston (a primary piston and secondary piston) 7, a tire (including a caliper, a rotor and a tire wheel) 8, a reservoir tank 9, a pedal reaction force creating mechanism 12, a stroke sensor 20, a rod 21, a spring 23, and a vehicle state information acquiring portion 30. In this case, the vehicle state information is information which is necessary for controlling, such as a vehicle speed, ON/OFF of an accelerator and the like. Further, the motor-driven actuator 1 is constructed by a master cylinder 10, a motor-driven type assisting cylinder 11 which is installed in an upstream side of the master cylinder 10 and generates a brake assisting force, a stator 11A, a rotor 11B, a ball screw nut 11C which is engaged with the rotor 11B, a ball screw shaft 11D, an ECU 16, and various signal lines 17.

The stator 11A and the rotor 11B apply a rotating torque to the ball screw nut 11C, drives the ball screw shaft 11D in a direct acting direction, and boosts the master cylinder 10. The boosted working fluid flows into the brake pressure distributing apparatus 3 via the brake pipings 4A and 4B. The brake pressure distributing apparatus 3 distributes a brake pressure to right and left tire wheels in front and rear sides, as occasion demands. Taking the front right tire wheel for example, the caliper 8CFR is boosted via the brake piping 5FR from the brake pressure distributing apparatus 3, the rotor 8BFR is pressed, and the tire wheel 8AFR is braked.

Next, a description will be given of a mechanism of a brake assisting force generation. The rotor 11B and the ball screw nut 11C are engaged within the assisting cylinder 11 which is extended to a longitudinal direction of a vehicle body, and are rotatably installed by a bearing (not shown) with respect to a casing 11E. The rotor 11B and the ball screw shaft 11C are exposed to the rotating torque by an electromagnetic force from the stator 11A, on the basis of an assisting command of the ECU 16, and the ball screw shaft 11C drives in a direct acting direction.

The ECU 16 is connected to a steering wheel 6 via a steering speed signal line 17A, to the assisting cylinder 11 via an assisting force command signal line 17B, to the pedal reaction force creating mechanism 12 via a pedal reaction force command signal line 17C, to a stroke sensor 20 via a pedal stroke signal line 17D, and to the vehicle state information acquiring portion 30 via a vehicle state signal line 17E, respectively.

In the case that an acceleration is not generated in a lateral direction of the vehicle, such as a straight going deceleration time or the like, the ECU 16 calculates a command value to the assisting cylinder 11 on the basis of a pedal stroke information which is received via the pedal stroke signal line 17D.

In the case that the steering wheel 6 is steered, such as a curve deceleration time or the like, the ECU 16 calculates a laterally applied jerk of the vehicle on the basis of the steering speed information received via the steering speed signal line 17A, and the vehicle speed information received via the vehicle state signal line 17E.

The calculation of the laterally applied jerk may employ a method described in "Understanding and Evaluation of Driver and Vehicle Dynamic Characteristics based upon Jerk Information—An Investigation of Longitudinal and Lateral Integrated Control", Makoto Yamakado, et al., Collected Papers of Society of Automotive Engineers of Japan, Vol. 39, No. 3, May 2008.

In this case, in "Study on Handling Characteristics of Longitudinal Acceleration Controlled Vehicle Combined with Lateral Motion—Proposal of Acceleration (G) Vectoring Control for the Improvement of Vehicle Agility and Stability", Makoto Yamakado, et al., Spring Academic Lecture Meeting Preliminary Reports of Society of Automotive Engineers of Japan, 36-20085351, there has been known that an appropriate deceleration is definitely determined in accordance with a laterally applied jerk.

The ECU 16 calculates a target deceleration on the basis of the laterally applied jerk information (Expression 1).

$$Gxc = -sgn(Gy \cdot Gy')Cxy/(1+Ts)|Gy'|G_{x\_DC}$$

In this case, Gxc is a target deceleration, Gy is a laterally applied jerk of a vehicle, Gy' is a laterally applied jerk of a vehicle, and $Cxy/(1+Ts)$ is a first-order lag gain. A signum term is a term corresponding to right and left of steering, and $G_{x\_DC}$ is a deceleration component which does not link to a lateral motion, for example, a necessary term for a forecasting deceleration in the case that a corner exists forward.

Further, the ECU 16 commands the pedal reaction force to the pedal reaction force creating mechanism 12 via the pedal reaction force command signal line 17C, on the basis of the pedal stroke information received via the pedal stroke signal line 17D, and the calculated target deceleration.

As mentioned above, if the driver steps on the brake pedal 2, the stroke sensor 20 detects the stroke, whereby the ball screw nut 11C drives, and the ball screw shaft 11D is actuated. Accordingly, the primary piston 7A connected to the ball screw shaft 11D displaces, and the pressure chamber 10A is boosted. The secondary piston 7B displaces on the basis of a balance between the springs 23A and 23B, and internal pressures of the pressure chambers 10A and 10B, and the pressure chamber 10B is boosted in the same manner. As a result of being boosted, the brake pressure is transmitted to a downstream side.

Figure 3:
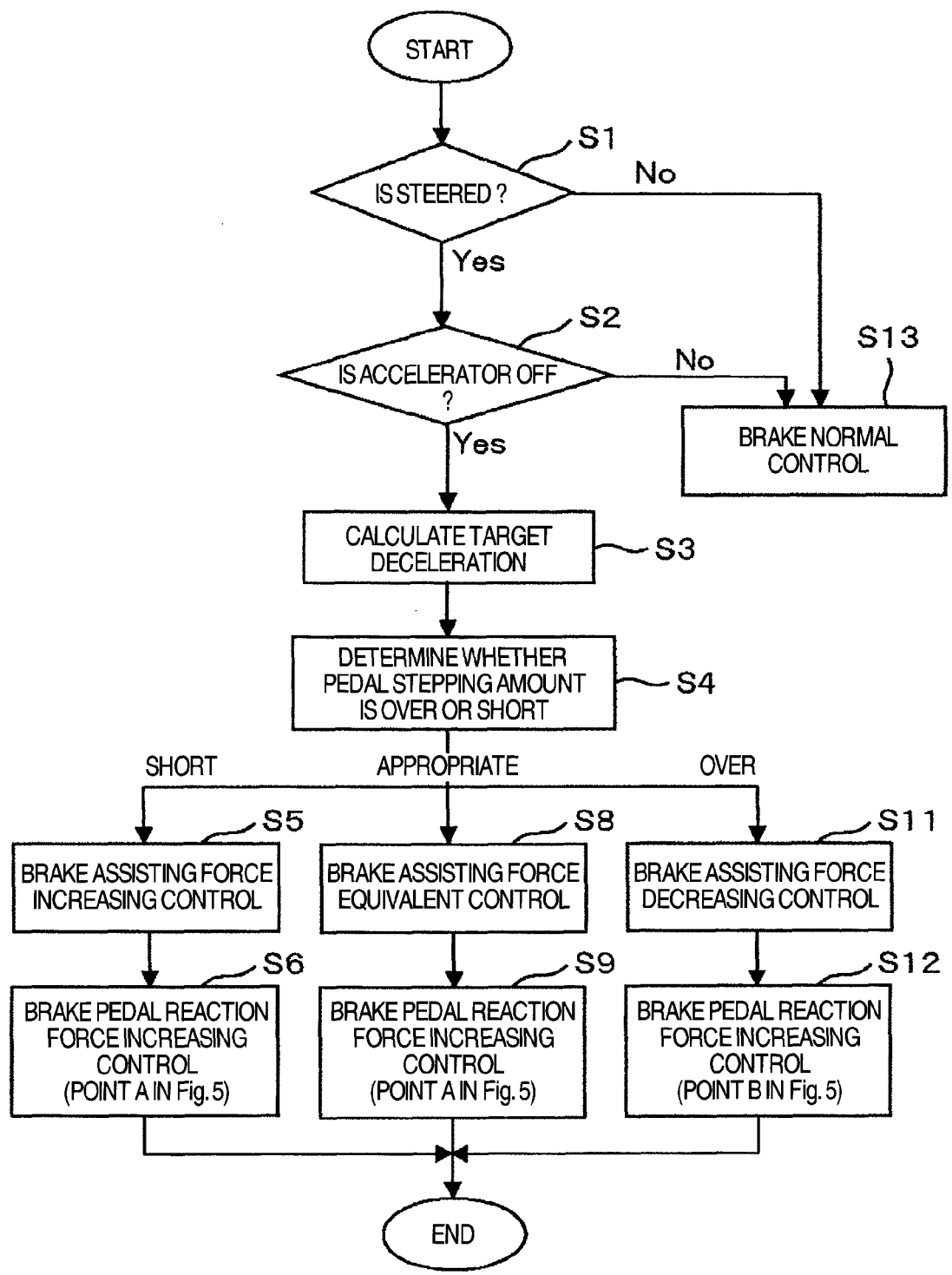
FIG. 3 is a view showing a control flow.
Figure 4:
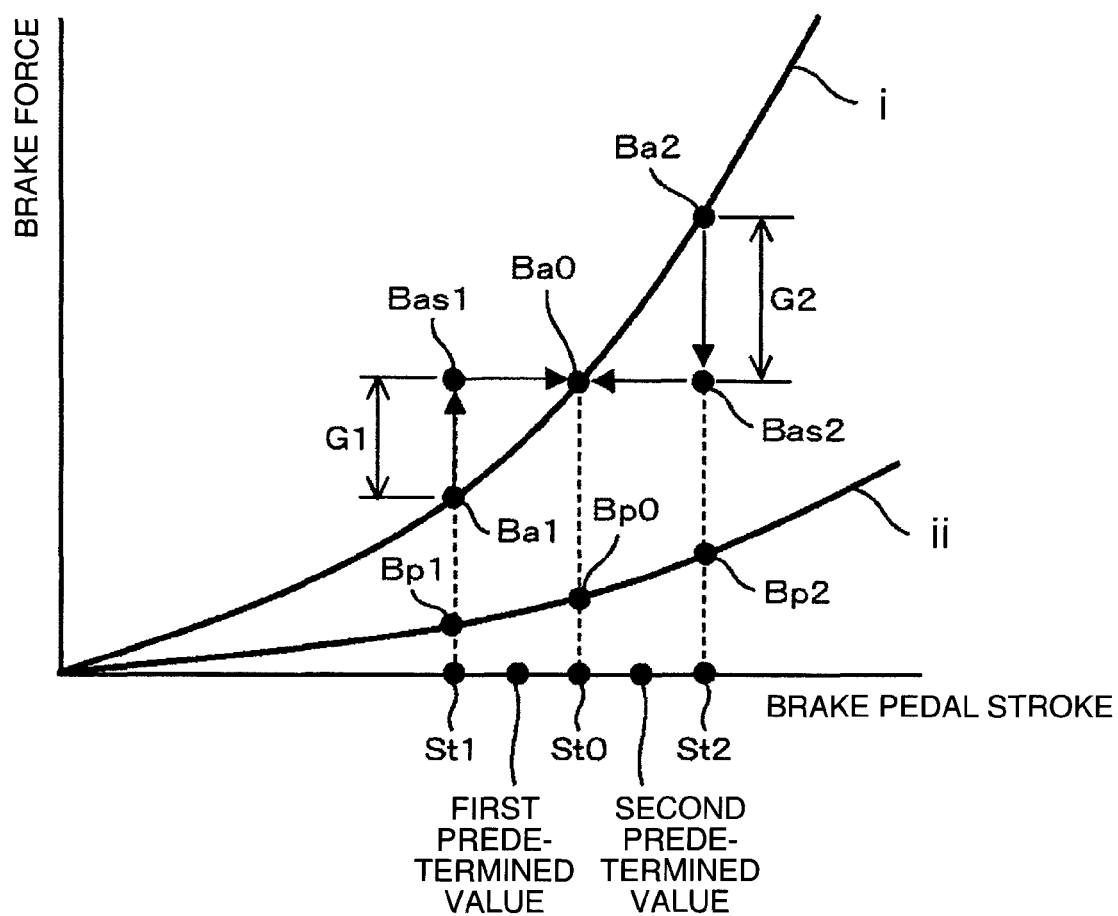
FIG. 4 is a view showing a relationship between a brake force and a pedal stroke.
Figure 5:
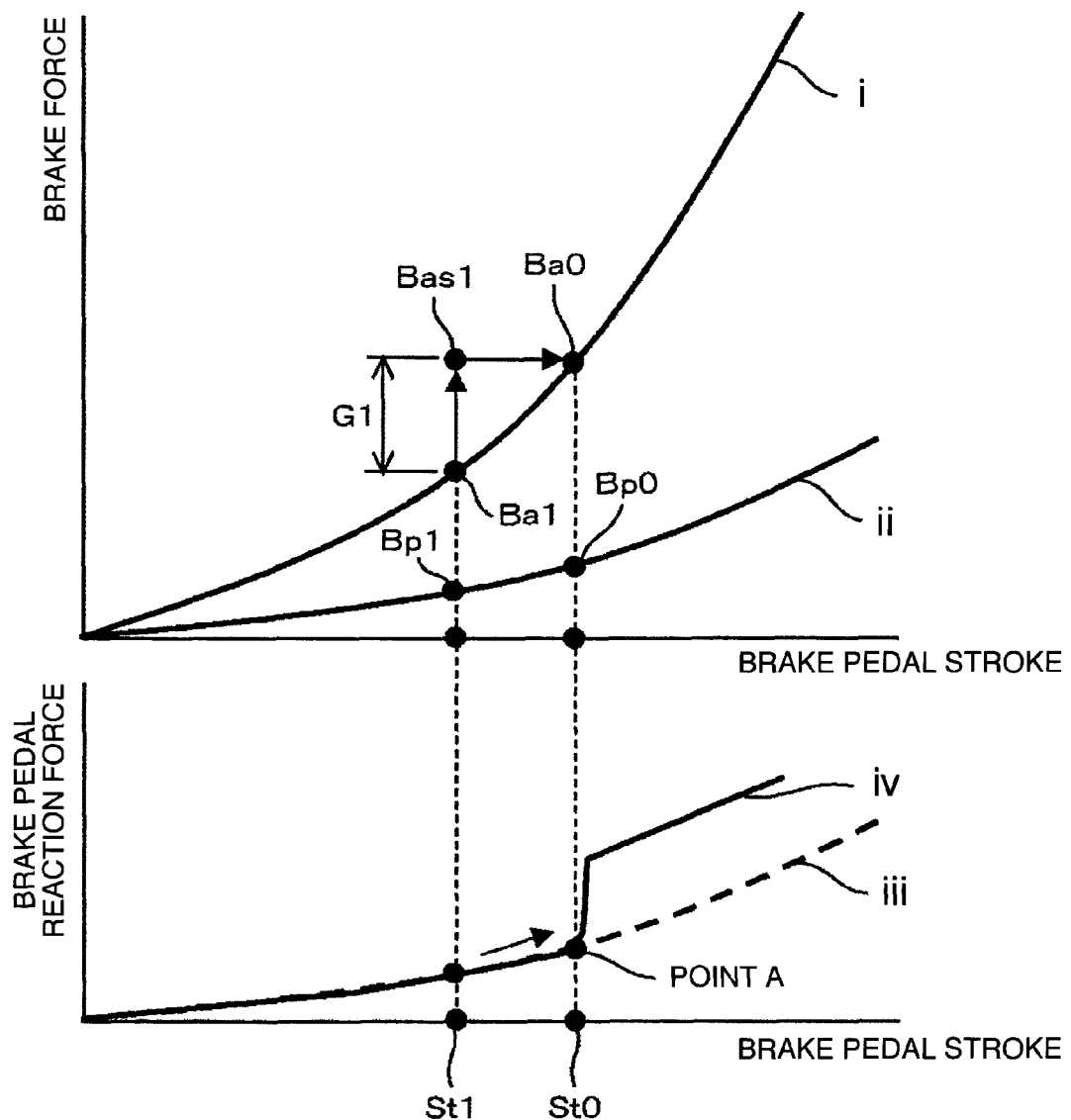
FIG. 5 is a view showing output values of the brake force and a pedal reaction force at a time when a pedal stepping amount comes short.
Figure 6:
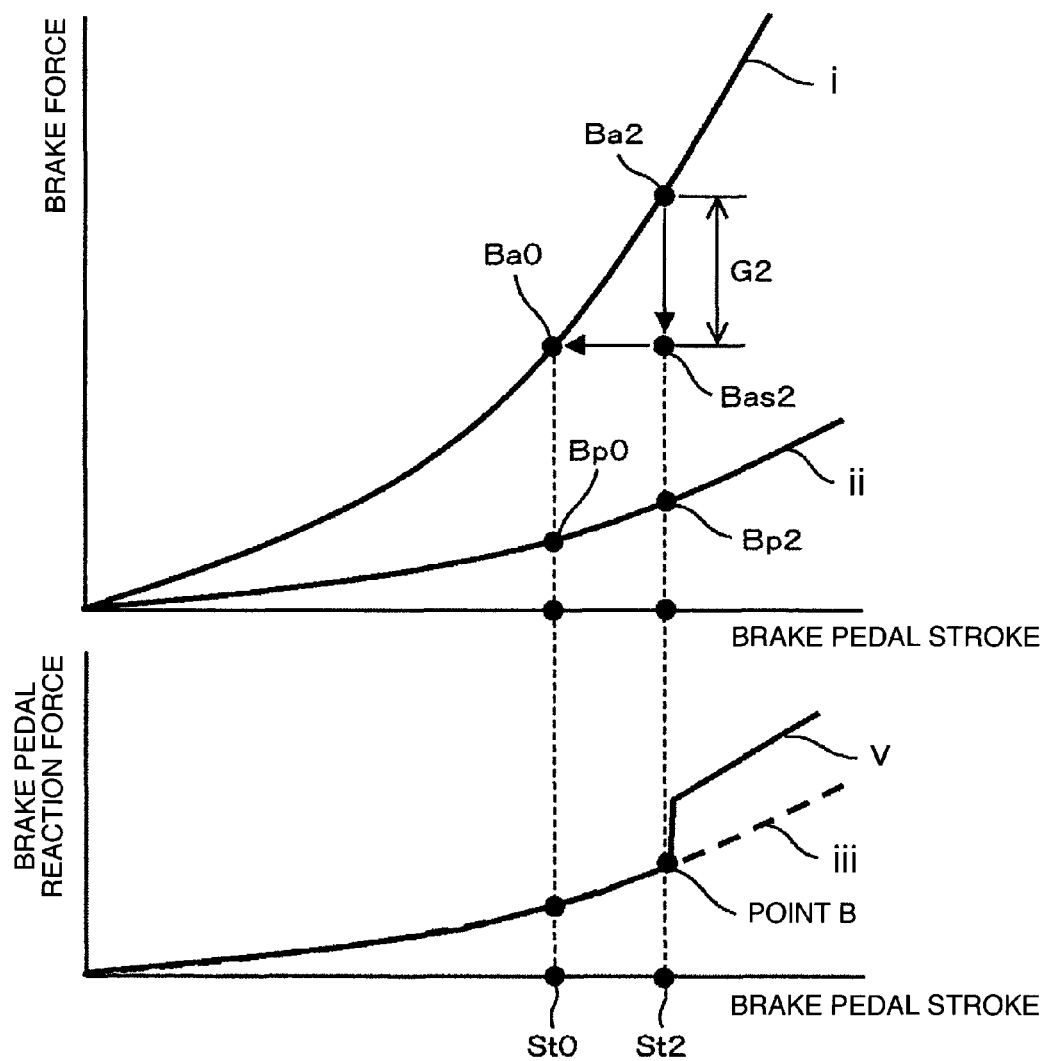
FIG. 6 is a view showing output values of the brake force and the pedal reaction force at a time when the pedal stepping amount is excess.

FIG. 3 is a view showing a control flow of FIG. 1, FIG. 4 is a view showing a relationship between a brake force and a pedal stroke, FIG. 5 is a view showing output values of the brake force and a pedal reaction force at a time when a pedal stepping amount comes short, and FIG. 6 is a view showing output values of the brake force and the pedal reaction force at a time when the pedal stepping amount is excess. In this case, in FIG. 4, a line ii indicates a brake force caused by the stepping of the driver, and a line i indicates a brake force (an assisting brake pressure request characteristic) at a time of being assisted by the assisting cylinder 11. The characteristic may be previously stored in the ECU 16.

First of all, the ECU 16 determines whether or not the steering wheel 6 is steered (S1), determines whether or not the accelerator is in an OFF state (S2) in the case of determining the steering, and calculates the target deceleration on the basis of Expression 1 fro the vehicle speed and the steering speed (S3), in the case of determining the OFF state.

In the case that it is determined in S1 that the steering is not carried out, or in the case that the ON state is determined in S2, a normal brake control is carried out (S13). The control acts on the assisting brake pressure request characteristic in FIG. 4.

After S3, it is determined on the basis of the information of the stroke sensor 20 whether or not the pedal stepping amount of the driver is excess or short with respect to the target deceleration calculated by S3 (S4). In this case, a description will be given of S5 to S8 with reference to FIG. 5.

In the case that the stepping amount is less than a first predetermined value (comes short), it is assumed that a position of the pedal stroke is at a point St1. On a basis characteristic, if the stepping force is set to Bp1, the assisting force can be expressed by Ba1. On the contrary, the ECU 16 calculates the target brake pressure as Bas1, and controls the brake force so as to increase at a difference G1 (S5). The pedal reaction force gives indication of the basic characteristic such as a dotted line iii. After S5, the pedal reaction force is increased at a point A (St0), and the pedal reaction force is controlled in accordance with a stage stop like characteristic as shown by a line iv (S6).

Next, in the case that the stepping amount is in a range from the first predetermined value to a second predetermined value which is larger than the first predetermined value (appropriate), the value in accordance with the basic characteristic is output (S7). The pedal reaction force is controlled in the same manner as S6.

Next, a description will be given of S9 and S10 with reference to FIG. 6.

In the case that the stepping amount is equal to or more than the second predetermined value (excess), it is assumed that the position of the pedal stroke is at a point St2. On the basic characteristic, if the stepping force is assumed to be Bp1, the assisting force can be expressed as Ba2. On the contrary, the ECU 16 calculates the target brake pressure as Bas2, and controls the brake force so as to decrease at a difference G2 (S9). After S9, the pedal reaction force is increased at a point B (St2), and the pedal reaction force is controlled in accordance with a stage step like characteristic as shown by a line v (S10).

In this case, the point A and the point B are points (threshold values) for starting the control of increasing the pedal reaction force, and are changed in accordance with the deceleration of the vehicle. Accordingly, it is possible to appropriately carry out the control of the pedal reaction force in correspondence to the deceleration.

In this case, in the present embodiment, in the case that the driver steps the pedal repeatedly at two times or more, it is possible to control by giving priority to the brake input of the driver. Accordingly, the brake action at an emergency time becomes on the initiative of the driver, and it is possible to secure a sense of security for driving. Further, in the present embodiment, the assisting cylinder 11 and the ECU 16 are separated, however, they may be integrated. In this case, since it is possible to achieve a downsizing of the system, a mounting property to the vehicle is improved.

As mentioned above, an appropriate brake force can be obtained on the basis of the laterally applied jerk information of the vehicle, the driver can feel an appropriate pedal control amount, and can control the brake pedal with a safe conscience. Further, the brake pedal control amount of the driver, the brake force and the deceleration (the deceleration feeling) have affected conventionally with each other, however, in the present embodiment, it is possible to carry out a comfortable deceleration control without a skill of the driver. In this case, at the point A, the pedal may be oscillated for the purpose of informing the driver of the control state. In this case, the driver can know an appropriate pedal stroke position.

In S6, S8 and S10, if the pedal reaction force is controlled in proportion to the pedal stroke, the same feeling as the conventional brake can be obtained.

In this case, in S6, S8 and S10, the pedal reaction force may be controlled in proportion to the brake pressure. In this case, it is possible to achieve a so-called light pedal or heavy pedal, by varying a proportionality factor. Further, in S6, S8 and S10, it is possible to control in such a manner as to automatically stroke the pedal to an optimum position. In this case, since the necessary pedal stroke can be maintained without intension of the driver, there is an effect for lightening the burden of the driver.

A confirmation of the execution of the present embodiment can be visually confirming that the assisting apparatus which can create the brake force is provided independently from the pedal input of the driver, and measuring and confirming a history of the laterally applied jerk at a time of the curve acceleration, the laterally applied jerk, the longitudinal acceleration and the pedal reaction force.

Figure 7:
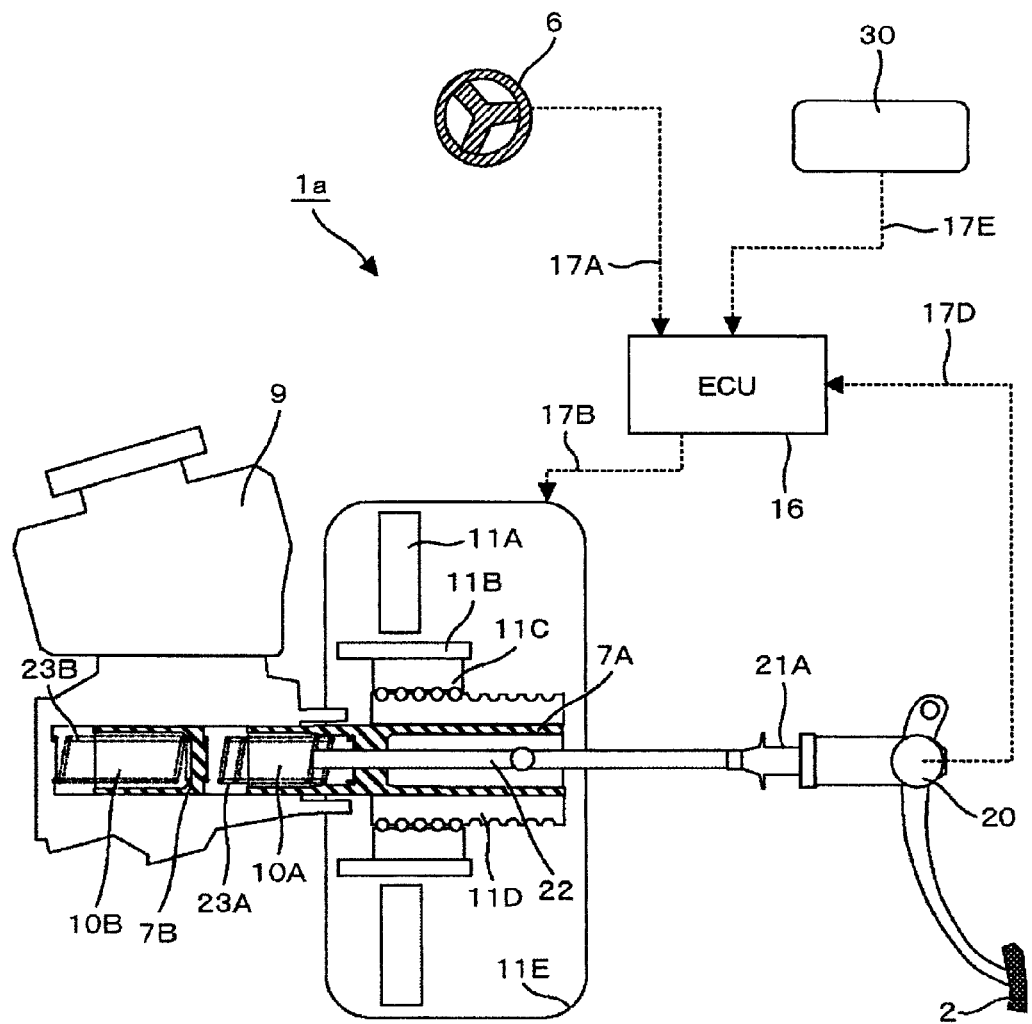
FIG. 7 is a cross sectional view of a brake control apparatus to which a pedal is mechanically connected.

FIG. 7 is a cross sectional view of a brake control apparatus to which a pedal is mechanically connected.

In the present embodiment, an input rod 21A transmitting a stepping force of the driver is connected to an input rod 22, and the structure is made such that the stepping force directly pressurizes the liquid chamber 10A. The other structures are the same as the first embodiment. In this case, since the pedal reaction force creating mechanism is not provided, the structure can be simplified, and it is effective for a low cost, a downsizing and a simplification of a control property.

It should be further understood by those skilled in the art that the foregoing description has been made on embodiments of the invention and that various changes and modifications may be made in the invention without departing from the spirit of the invention and the scope of the appended claims, without being limited to them.

INDUSTRIAL APPLICABILITY

The present invention provides the brake control apparatus provided with the assisting apparatus which creates the brake force well keeping the deceleration feeling, controls the pedal reaction force so as to improve the pedal feeling, and assists the stepping force of the brake pedal.

DESCRIPTION OF REFERENCE NUMERALS 1 motor-driven actuator
2 brake pedal
3 brake pressure distributing apparatus
4, 5 brake piping
6 steering wheel
7 piston
8 tire wheel
9 reservoir tank
10 master cylinder
11 assisting cylinder
12 pedal reaction force creating mechanism
16 ECU
17 communication line
20 stroke sensor
21 rod
23 spring
30 vehicle state information acquiring portion

The invention claimed is:

1. A brake control apparatus comprising:
an ECU;
an electric motor connected to said ECU via a signal line;
a reaction force creating mechanism;
a ball screw engaged with a rotating shaft of said electric motor; and
a master cylinder generating a brake fluid pressure,
wherein said ECU calculates a target brake force and a target pedal reaction force on the basis of a target deceleration obtained by a laterally applied jerk in a lateral direction of a vehicle, a stepping amount of a brake pedal by a driver, a fluid pressure of the master cylinder and a command electric current of the electric motor, and
said reaction force creating mechanism creates a reaction force of said brake pedal on the basis of said target pedal reaction force.

2. A brake control apparatus as claimed in claim 1, further comprising:
a threshold value changing portion changing a threshold value of a stroke of said brake pedal in correspondence to a deceleration of said vehicle; and
a pedal reaction force creating portion changing a pedal reaction force in the vicinity of the threshold value which said threshold value changing portion changes.

3. A brake control apparatus as claimed in claim 1, further comprising:
a pedal reaction force creating portion generating a pedal reaction force in said brake pedal; and
a brake control portion controlling a brake force in such a manner as to hold down a brake input fluctuation of a driver,
wherein said pedal reaction force creating portion holds down a fluctuation of said pedal reaction force in correspondence to a predetermined deceleration and a pedal reaction force characteristic.

4. A brake control apparatus as claimed in claim 3, further comprising:
a calculating portion calculating a target deceleration on the basis of a laterally applied jerk information in a lateral direction of the vehicle in the case of setting a vehicle moving direction to a forward direction,
wherein said brake control portion controls the brake force in such a manner as to come to said target deceleration, and
wherein said pedal reaction force creating portion increases the pedal reaction force in the case that the stepping amount of said brake pedal reaches a first predetermined amount, with respect to said target deceleration.

5. A brake control apparatus as claimed in claim 4, wherein said pedal reaction force creating portion increases said brake force in the case that said stepping amount reaches said first predetermined value, and does not reach a second predetermined value which is larger than said first predetermined value, and decreases said brake force in the case that said stepping amount is equal to or more than said second predetermined value.

6. A brake control apparatus as claimed in any one of claims 3 to 5, wherein said brake control portion gives priority to the brake input of the driver in the case that the driver steps said brake pedal repeatedly at two or more times.

7. A brake control apparatus as claimed in any one of claims 3 to 5, wherein said brake pedal is oscillated in the case that the stepping amount of said brake pedal reaches between said first predetermined value and said second predetermined value, for the purpose of informing said driver of a control state.

8. A brake control apparatus as claimed in any one of claims 2 to 5 and 1, wherein an input shaft of said brake pedal and a piston of said master cylinder are not mechanically connected.

* * * * *